United States Patent
Ganz

(10) Patent No.: US 6,525,507 B2
(45) Date of Patent: Feb. 25, 2003

(54) SOLAR SYSTEM FOR A MOTOR VEHICLE

(75) Inventor: Thomas Ganz, Stockdorf (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/837,761

(22) Filed: Apr. 19, 2001

(65) Prior Publication Data

US 2002/0000785 A1 Jan. 3, 2002

(30) Foreign Application Priority Data

Apr. 19, 2000 (DE) ................................ 100 19 675

(51) Int. Cl.[7] .............................................. H01M 10/46
(52) U.S. Cl. ......................................... 320/101; 320/166
(58) Field of Search ................................. 320/101, 166, 320/104, 124, 128, 138; 307/66, 46, 43

(56) References Cited

U.S. PATENT DOCUMENTS

| | | | |
|---|---|---|---|
| 5,259,814 A | 11/1993 | Weissbrich et al. | 454/75 |
| 5,479,557 A | * 12/1995 | Ganz et al. | 320/102 |
| 6,166,515 A | * 12/2000 | Barde et al. | 320/101 |
| 6,194,793 B1 | * 2/2001 | Fisher, Jr. | 307/66 |
| 6,239,567 B1 | * 5/2001 | Sunaga wt al. | 318/432 |

FOREIGN PATENT DOCUMENTS

| | | |
|---|---|---|
| DE | 40 17 670 A1 | 12/1991 |
| DE | 198 09 399 A1 | 2/1999 |

* cited by examiner

Primary Examiner—Edward H. Tso
Assistant Examiner—Lawrence Luk
(74) Attorney, Agent, or Firm—Nixon Peabody LLP; David S. Safran

(57) ABSTRACT

A solar system for a motor vehicle has a solar generator and an energy storage for supplying power to at least one power consuming device, the solar generator being intended for charging of the energy storage, which is formed by at least one high-capacitance capacitor.

13 Claims, 2 Drawing Sheets

SOLAR SYSTEM FOR A MOTOR VEHICLE

BACKGROUND OF THE INVENTION

1. Field of the Invention

This invention relates to a solar system for a vehicle, especially a motor vehicle, which has a solar generator and an energy storage for supplying power to at least one power consuming device, the solar generator being intended for charging of the energy storage.

2. Description of Related Art

Generic solar systems (see, for example, German Patent DE 41 30 226 C1 corresponding U.S. Pat. No. 5,259,814) ordinarily comprise a solar generator on the motor vehicle roof, for example integrated into an adjustable cover, the generated electrical power of which is used to charge the motor vehicle battery which is usually a 12 V lead storage battery, and to operate the motor of a fan which can ventilate the vehicle interior while the vehicle is standing still and thus can especially control the climate much more favorably in the case of strong incident solar radiation. Providing a control device which can, for example, prevent the auxiliary fan motor from discharging the motor vehicle battery is known.

The auxiliary fan is often operated depending on the incident solar radiation. This can often result in operation of the fan motor for a long time at an unfavorable operating point. This results in low hydraulic efficiency and also a reduction of the service life due to increased bearing wear (the lubricating film only builds up at several hundred rpm) and furthermore results in the deposition of paste-like abraded carbon particles on the collector when an electric motor with brushes is used. In this design, the service life of the motor in solar operation is problematic. Brushless fan motors, however, require relatively high minimum voltages for their operation, ideally the vehicle electrical system voltage, and a relatively high minimum power supply.

SUMMARY OF THE INVENTION

The primary object of this invention is to devise a solar system for a motor vehicle which enables more flexible and thus more efficient operation of a power consuming device supplied by the solar generator or the energy storage and thus offers relative high discharge safety of the energy storage.

This object is achieved by a solar system for a motor vehicle with a solar generator and an energy storage for supplying power to at least one power consuming device, where the solar generator charges the energy storage, and where the energy storage is at least one high-capacitance capacitor. Here, it is advantageous to use a capacitive energy storage with high capacitance in interaction with a solar generator. On the one hand, higher and more variable operating voltages are possible since one such energy storage is much more resistant to markedly cyclic operation than the conventionally used 12 V lead storage batteries. On the other hand, the inherently smaller energy storage capacity compared to conventional lead storage batteries, especially the high self-discharge during longer stationary periods, can be balanced by means of the charging option via the solar generator. In addition, the solar generator during the operating periods of the motor vehicle offers support of the capacitive energy storage so that, especially at a high solar output, it is also possible to save fuel.

In the following, the invention is described in greater detail with reference to the accompanying drawings.

DETAILED DESCRIPTION OF THE DRAWINGS

Figure 1:
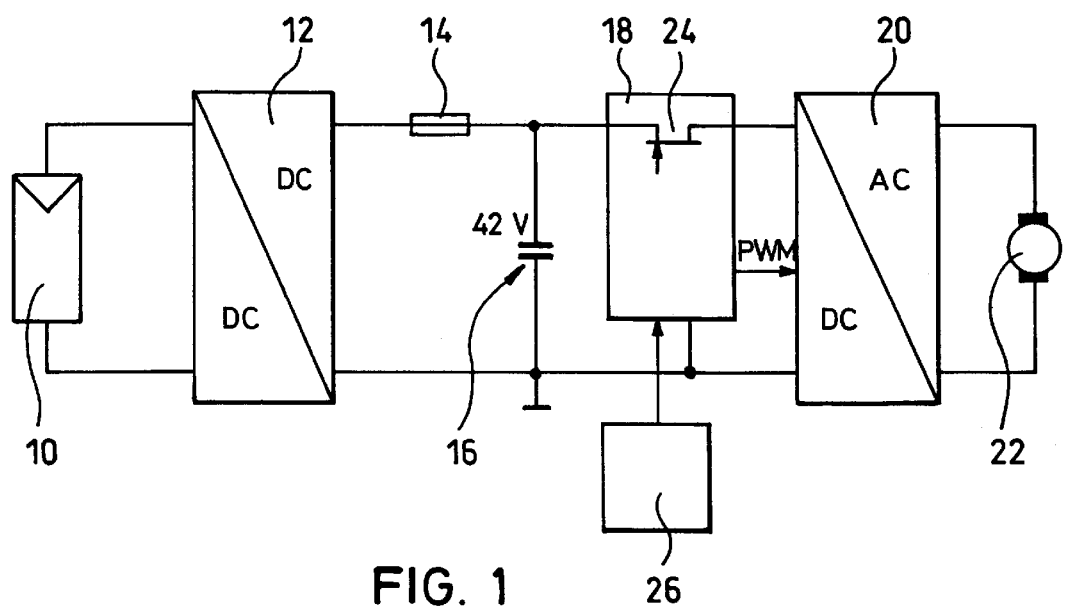
FIG. 1 schematically shows a sample circuit of a solar system.

FIG. 1 shows a schematic example for the circuit of a solar system for a motor vehicle with a solar generator and an energy storage for power supply of at least one power consuming device, where the solar generator charges the energy storage, and where the energy storage is at least one high-capacitance capacitor. Here, the solar generator 10 is connected via a step-up DC/DC converter 12 and a fuse 14 parallel to a capacitor 16 in order to provide the capacitor 16 with charging current. Furthermore, the motor 22 of a fan or blower is connected in parallel to the capacitor 16 or the solar generator 10 via a control means 18 and a DC/AC converter 20.

The control means 18 comprises a power switch 24 and acquires a signal from an air conditioning module 26 as the input signal.

The solar generator 10 and the step-up converter 12 are preferably located in the roof area of the motor vehicle, and the solar generator 10 and the step-up converter 12 can be integrated, for example, into an adjustable cover, for example, of a sliding roof. The fuse 14 is preferably a 2.0 A fuse.

The capacitance of the capacitor 16 is preferably at least 1 farad and is especially between 10 and 100 farad. There can also be several such capacitors. The capacitor 16 preferably undertakes supply of the entire motor vehicle electrical system, and a conventional 12 V lead storage battery can be completely abandoned. The vehicle electrical system and the capacitor 16 are designed preferably for a nominal voltage of 42 V.

The fan motor 22 is preferably made brushless, then the DC/AC converter 20 being integrated into the motor electronics. The control unit 18 is made such that the control unit 18 controls the operation of the motor 22 depending on the charging state of the capacitor 16, and the control unit 18 can be made, for example, such that the fan motor 22 can be supplied with current only when a predetermined threshold value of the voltage of the capacitor 16, for example, the vehicle electrical system nominal voltage, is exceeded. Preferably, the motor 22 is controlled by the control unit 18 by means of pulse width modulation (PWM) via the switch 24, the motor 22 preferably being operated intermittently at a working point with optimum efficiency. The signal from the air conditioning module 26 is used to avoid unnecessary operation of the fan motor 22, for example, at a relatively low temperature of the motor vehicle interior.

The solar system is dimensioned such that the solar generator 10 can also charge the capacitor 16 from the completely discharged state up to the nominal voltage of the vehicle electrical system. Only when this nominal voltage on the capacitor 16 is exceeded does the control unit 18 release the fan motor 22 for operation. One important advantage of the execution of the energy storage by means of high-capacitance capacitors is that one such energy storage is maintenance-free, has almost unlimited cycle resistance, and also cannot be overcharged. The recharging possibility via the solar generator 10 compensates for the high self-discharge rate of the capacitors, one defect of a capacitive energy storage compared to conventionally used 12 V lead storage batteries. This recharging possibility represents a major synergy effect from the combined use of a solar generator and a capacitive energy storage. The high cycle resistance of the capacitor 16 enables operation of the fan motor 22 at an operating point with high efficiency. In particular in this way, a high fan rpm can be used. Furthermore, the described system is made relatively simple overall.

Figure 2:
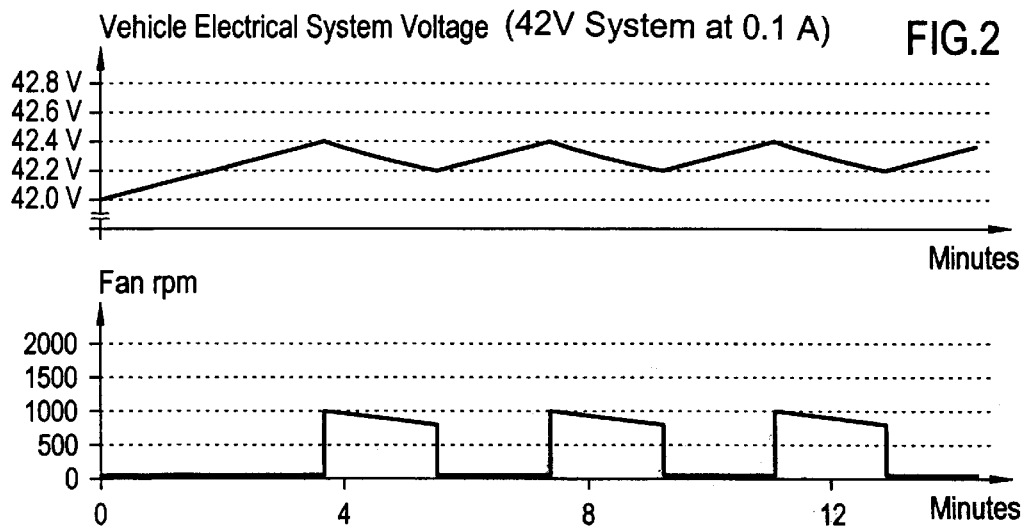
FIG. 2 shows sample behavior of the fan rpm and the vehicle electrical system voltage for a solar feed current of 0.1 A.
Figure 3:
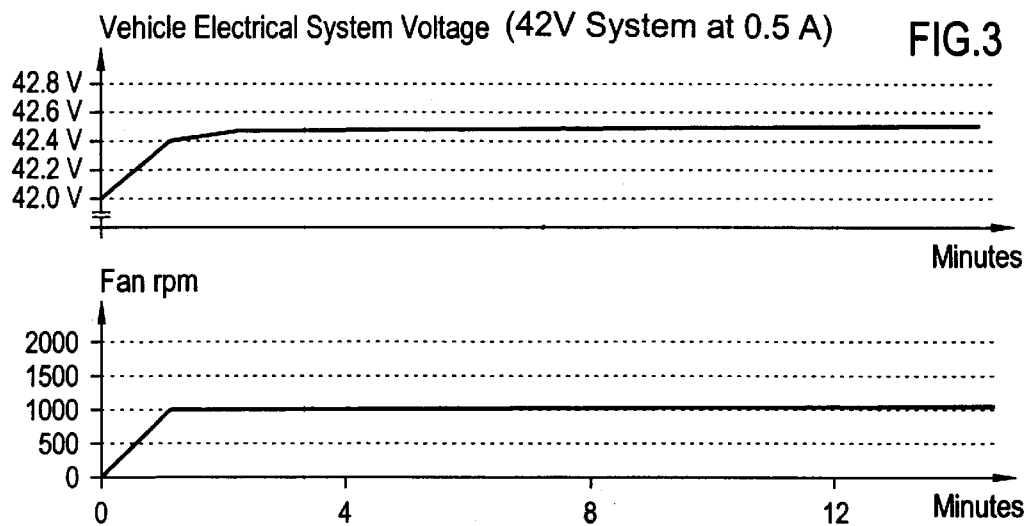
FIG. 3 shows sample behavior of the fan rpm and the vehicle electrical system voltage for a solar feed current of 0.5 A.
Figure 4:
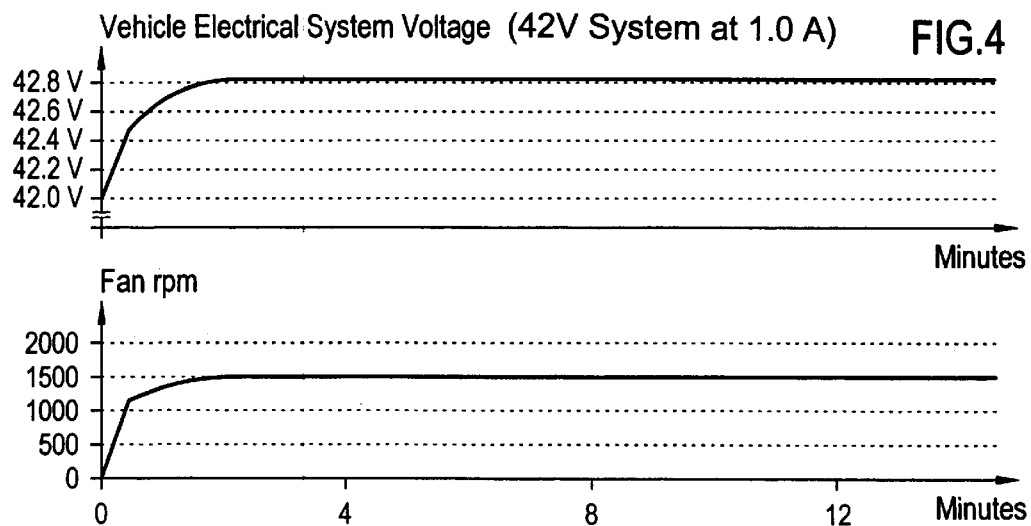
FIG. 4 shows sample behavior of the fan rpm and the vehicle electrical system voltage for a solar feed current of 1.0 A.

FIGS. 2 to 4 show, by way of example, the behavior of the vehicle electrical system voltage and the fan rpm when a current of 0.1 A, 0.5 A, and 1.0 A is produced by the solar generator 10. Here, the control means 18 is set up such that the control means 18 supplies current to the fan 22 only when the vehicle electrical system voltage of 42.0 V is exceeded. Thus, a solar current of 1.0 A corresponds to the nominal output of the solar generator 10.

Since a conventional 12 V lead storage battery is to be eliminated, the capacitance of the capacitor 16 should be enough to be able to actuate the starter motor of the motor vehicle.

What is claimed is:

1. A solar system for a motor vehicle, comprising:
   a solar generator,
   an energy storage for power supply of at least one power consuming device, and
   a step-up DC/DC converter provided between the solar generator and the energy storage
   wherein the solar generator charges the energy storage and wherein the energy storage is at least one high-capacitance capacitor.

2. The solar system as claimed in claim 1, wherein the capacitance of the at least one high-capacitance capacitor is at least 1 farad.

3. The solar system as claimed in claim 2, wherein the capacitance of the at least one high-capacitance capacitor is between 10 and 100 farads.

4. The solar system as claimed in claim 1, further comprising an entire vehicle electrical system, and wherein the energy storage is adapted to power the entire vehicle electrical system.

5. The solar system as claimed in claim 4, wherein the vehicle electrical system has a nominal voltage of 42 V.

6. The solar system as claimed in claim 4, wherein the vehicle electrical system comprises an auxiliary fan motor.

7. The solar system as claimed in claim 6, wherein the auxiliary fan motor is a brushless auxiliary fan motor.

8. The solar system as claimed in claim 6, wherein a control unit controls the operation of the auxiliary fan motor depending on a charging state of the energy storage.

9. The solar system as claimed in claim 8, wherein the auxiliary fan motor is only actuatable by the control unit when a predetermined threshold value of the voltage of the energy storage is exceeded.

10. The solar system as claimed in claim 9, wherein the predetermined threshold value of the voltage of the energy storage is set at a nominal voltage of the vehicle electrical system.

11. The solar system as claimed in claim 9, wherein the control unit is adapted to operate the auxiliary fan motor intermittently by at a working point with optimum efficiency.

12. The solar system as claimed in claim 11, wherein the control unit includes means for operating the auxiliary fan motor by pulse width modulation.

13. The solar system as claimed in claim 8, wherein the control unit is operative for controlling the auxiliary fan motor responsive to a signal of an air conditioning module.

* * * * *